(12) United States Patent
Carroni et al.

(10) Patent No.: US 7,832,213 B2
(45) Date of Patent: Nov. 16, 2010

(54) OPERATING METHOD FOR A TURBOGROUP

(75) Inventors: Richard Carroni, Niederrohrdorf (CH); Dieter Winkler, Lauchringen (DE); Andreas Brautsch, Wuerenlingen (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 12/051,669

(22) Filed: Mar. 19, 2008

(65) Prior Publication Data
US 2008/0236168 A1  Oct. 2, 2008

(30) Foreign Application Priority Data

Mar. 27, 2007  (DE) .................. 10 2007 015 309

(51) Int. Cl.
*F02C 3/30* (2006.01)
(52) U.S. Cl. ....................................... 60/775; 60/39.53
(58) Field of Classification Search .................. 60/775, 60/39.53, 39.59, 39.55, 728
See application file for complete search history.

(56) References Cited

U.S. PATENT DOCUMENTS

| 2,115,338 | A | * | 4/1938 | Lysholm ...................... 60/773 |
| 5,461,854 | A | * | 10/1995 | Griffin, Jr. ................... 60/775 |
| 5,689,948 | A | * | 11/1997 | Frutschi ...................... 60/774 |
| 6,250,064 | B1 | | 6/2001 | Tomlinson et al. |
| 6,484,508 | B2 | | 11/2002 | Rocklin et al. |
| 6,530,210 | B2 | | 3/2003 | Horii et al. |
| 7,007,484 | B2 | | 3/2006 | Stegmaier et al. |
| 7,526,920 | B2 | * | 5/2009 | Hoffmann et al. ............. 60/775 |
| 2006/0010876 | A1 | | 1/2006 | Hoffmann et al. |

FOREIGN PATENT DOCUMENTS

| DE | 10352088 A1 | 8/2005 |
| EP | 1203866 A2 | 5/2002 |
| WO | 2004051062 A1 | 6/2004 |
| WO | 2007000390 A1 | 1/2007 |

* cited by examiner

*Primary Examiner*—Michael Cuff
*Assistant Examiner*—Vikansha S Dwivedi
(74) *Attorney, Agent, or Firm*—Volpe and Koenig P.C.

(57) ABSTRACT

A method for operating a turbogroup, especially of a power generating plant, is provided. The turbogroup includes a compressor for compressing combustion air, a combustion chamber with at least one burner for producing a hot gas, and a turbine for expanding the hot gas, performing work. The method includes feeding combustion air to a compressor, where it is compressed, and fed to at least one burner and feeding a fuel to the at least one burner. The method also includes injecting water into the combustion air upstream of the burner where it is evaporated, mixing the fuel in the burner with the combustion air-water vapor mixture, combusting the fuel-combustion air-water vapor mixture in the combustion chamber, and feeding the hot gas which is produced in the combustion chamber to the turbine where it is expanded and performs work.

16 Claims, 2 Drawing Sheets

OPERATING METHOD FOR A TURBOGROUP

FIELD OF INVENTION

The present invention relates to a method for operating a turbogroup, especially such a turbogroup for a power generating plant.

BACKGROUND

A turbogroup, as is used in a power generating plant for power generation, customarily comprises a compressor for compressing combustion air, a combustion chamber for combusting a fuel with combustion air, and also a turbine in which the hot combustion exhaust gases are expanded, performing work. During operation of such energy conversion units, the formation of pollutant emissions is problematical. Therefore, the requirement for reducing the formation of pollutant emissions, especially of NOx emissions, permanently exists. The formation of NOx emissions has a strong connection to the temperature and to the pressure of the combustion process, wherein the NOx emissions increase superproportionally with increasing temperature or increasing pressure.

Instead of natural gas or instead of liquid fuels diluted with water, in principle it is known to use a fuel, the reactivity of which is higher or greater than that of natural gas. The use of highly reactive fuels already enables stable combustion reactions at lower temperatures. In practice, however, such highly reactive fuels are relatively strongly diluted, for example with water vapor or with nitrogen gas, in order to avoid an excessive temperature increase as a result of the combustion reaction. At the same time, these measures reduce the flame propagation speed, as a result of which the risk of a flame flashback can especially be reduced and therefore the operational safety of the turbogroup can be increased.

The introduction of water vapor into the fuel, however, is associated with a high cost. For example, the water must have comparatively high cleanliness in order to be able to add it to a fuel supply system of the turbogroup without any problem. Furthermore, the water or the water vapor must be brought to a comparatively high pressure, specifically to the compression pressure of the compressor, as a result of which a corresponding energy is required which ultimately reduces the overall efficiency of the turbogroup.

SUMMARY

The present invention starts at this point. The invention, as is characterized in the claims, deals with the problem of disclosing an improved embodiment for an operating method of the type mentioned in the introduction, which in particular enables comparatively low NOx emission values during the combustion of a highly reactive fuel, and wherein the risk of a flame flashback is also reduced. Furthermore, the operating method is to be realizable as cost-effectively as possible.

This problem is solved according to the invention by the subject of the independent claim. Advantageous embodiments are the subject of the dependent claims.

DETAILED DESCRIPTION OF THE PREFERRED EMBODIMENTS

The invention is based on the general idea of feeding water or water vapor for diluting the fuel, not to the fuel, but to the combustion air upstream of the burner. As a result of the dilution with water vapor, the combustion temperature in the burner can be lowered. At the same time, the risk of a flame flashback can consequently be reduced. The feed of the water vapor or the injection and evaporation of the water on the combustion air side in this case is of vital importance since comparatively impure water can also be used in the combustion air path. As a result of this, the water preparation can be realized more cost-effectively than in the case of an injection of water on the fuel side. Furthermore, the feed of water can be realized at a significantly reduced pressure, especially even at ambient pressure, which additionally reduces the cost of introducing the water. The costs for realizing the dilution of the fuel with water vapor can therefore be reduced by means of the operating method according to the invention. The mixing-through of the fuel with the combustion air-water vapor mixture in the burner, especially in a premix burner, leads to a reduced kinetic activity of the fuel, as a result of which the mixing-through of fuel, combustion air and water vapor is improved before ignition of the mixture. A homogenized mixture improves combustion and reduces pollutant emissions.

In the case of the fuel, it is a fuel which has a higher reactivity than natural gas, which can be used for a reduced NOx formation compared with the combustion of natural gas. For example a hydrocarbon-free combustible gas which contains hydrogen gas can be used as fuel. Such a combustible gas can also be referred to as synthesis gas or syngas. Such a syngas for example can be produced by means of partial oxidation of a fuel which has hydrocarbon content. Alternatively, a dry fuel, that is a water-free or water vapor-free evaporated liquid fuel, can also be used as fuel. Evaporated liquid fuels as a rule have a significantly higher reactivity than natural gas and, therefore, are regularly only fed to the burner in a form diluted with water or water vapor. The invention now makes it possible to also use a dry liquid fuel, such as dehydrated oil, for firing the burner of the turbogroup. Alternatively, hydrogen gas, which can be converted in a seemingly pollutant-free manner, can also be used as fuel.

Figure 1:
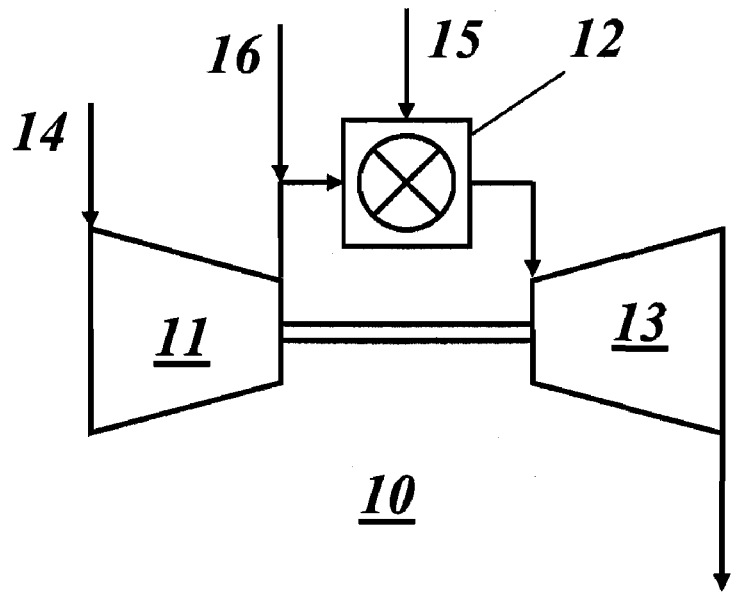
FIG. 1 is a schematic representation of the operating method of an embodiment according the disclosure.
Figure 2:
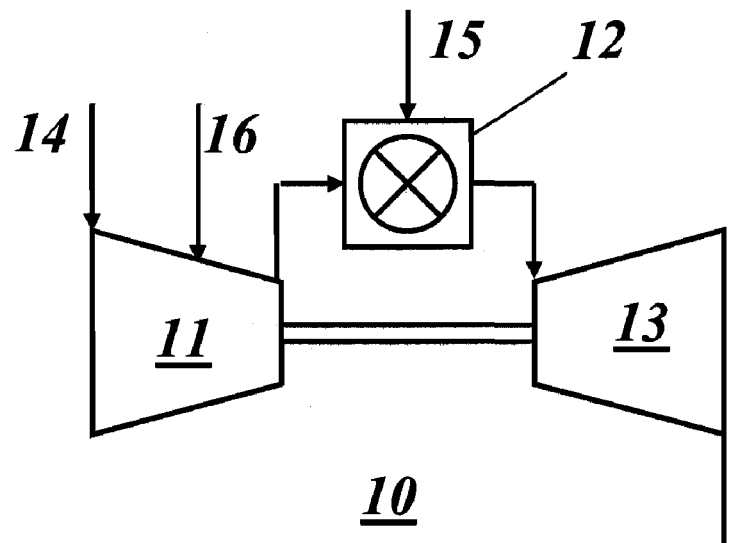
FIG. 2 is a schematic representation of the operating method of another embodiment according the disclosure.
Figure 3:
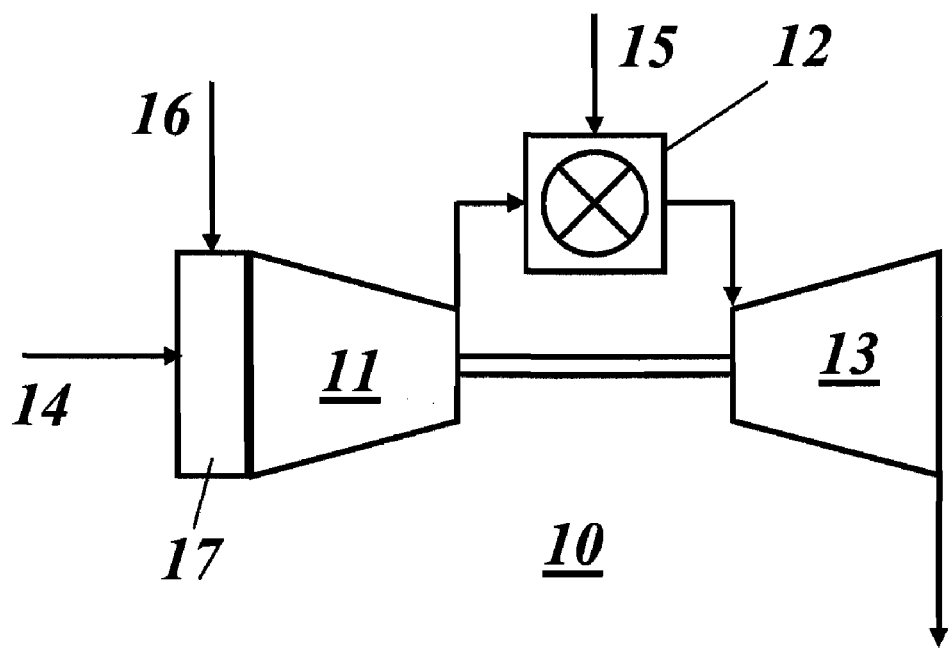
FIG. 3 is a schematic representation of the operating method of a further embodiment according the disclosure.

As shown in FIGS. 1-3 and according to a preferred embodiment of the operating method, water 16 is injected into the combustion air 16 in such measure that the vapor portion in the combustion air-water vapor mixture, which is directed from the compressor 11 to the burner 12, lies at less than ten percent by mass. Preferably, water 16 is injected in such measure that the vapor portion in the combustion air-water vapor mixture lies within a range of about five to eight percent by mass.

The operating method can additionally or alternatively also be designed so that water 16 is directly injected into the combustion air 14 in such measure that a dilution of about ten percent by volume is produced for the fuel 15 in the burner.

Several possibilities arise for injecting water 16 into the combustion air 14 path upstream of the burner 12. Preferably, the water 16 is injected so that the pressure which is required for injecting is as low as possible. For example, the water 16 is injected into the combustion air 14 still inside the compressor 11. The compressor 11 itself for example can have at least two pressure sections, specifically a high-pressure section and a low-pressure section. Compressors with three pressure sections are also known. The compressor then has a low-pressure section, an intermediate-pressure section, and a high-pressure section. The compressor 11 can be formed from a plurality of individual compressor units or can even have only a single compressor unit. The pressure sections which are referred to are then formed inside the single compressor unit by means of corresponding axial sections, or, in the case of a plurality of compressor units, are apportioned to the individual compressor units.

Preferably, the water 16 can now be injected into the combustion air 14 in an intermediate-pressure section of the compressor 11, or in a low-pressure section of the compressor 11. It is also possible in principle to inject the water 16 into the combustion air 14 between an intermediate-pressure section and a high-pressure section, or between a low-pressure section and an intermediate-pressure section, or between a low-pressure section and a high-pressure section.

Furthermore, it is possible in principle to also inject the water 16 into the combustion air 14 path upstream of the compressor 11, or in a compressor inlet section. In this case, the water 16 can be expediently introduced at atmospheric ambient pressure.

An embodiment shown in FIG. 3, in which for injecting the water 16 into the combustion air 16 an inlet atomizing device 17 is used, is especially advantageous. Such an inlet atomizing device 17 customarily serves for another purpose and is configured so that water vapor can be produced at or in a compressor inlet section as a result. By means of a corresponding modification and/or control of such an atomizing device 17, which possibly already exists in the turbogroup 10, the operating method which is proposed according to the invention can now be realized without a particularly high cost having to be involved for this purpose.

In another advantageous embodiment, a compressor intercooling device, which is basically provided for another purpose, can be provided to inject the water into the combustion air. By means of such a compressor intercooling device, which possibly already exists in the turbogroup, intercooling of the compressed combustion air can be realized on the compressor side. The compressor intercooling device is designed so that water for cooling purposes can be injected into the compressor between two pressure stages or two pressure sections as a result. By means of a corresponding modification or control of the compressor intercooling device, the operating method according to the invention can now be especially simply and cost-effectively realized.

What is claimed is:

1. A method for operating a turbogroup, which at least comprises a compressor for compressing combustion air, a combustion chamber with at least one burner for producing a hot gas, and a turbine for expanding the hot gas, performing work, the method comprising:
   feeding combustion air to a compressor, where it is compressed, and fed to at least one burner,
   feeding a fuel, having a higher combustion reactivity than natural gas, to the at least one burner,
   injecting water into the combustion air upstream of the burner where it is evaporated,
   mixing the fuel in the burner with the combustion air-water vapor mixture,
   combusting the fuel-combustion air-water vapor mixture in the combustion chamber, and
   feeding the hot gas which is produced in the combustion chamber to the turbine where it is expanded and performs work, wherein the water is injected in such measure that the vapor portion in the combustion air-water vapor mixture is about five to eight percent by mass.

2. The method as in claim 1, wherein
a hydrocarbon-free combustible gas which contains hydrogen gas is used as fuel, or
a dry, evaporated liquid fuel, for example dehydrated oil, is used as fuel, or hydrogen gas is used as fuel.

3. The method as in claim 2, wherein
water is injected into the combustion air in such measure that a dilution of about ten percent by volume is produced for the fuel in the burner.

4. The method as in claim 2, wherein
the water is injected into the combustion air inside the compressor.

5. The method as in claim 2, wherein
the water is injected into the combustion air upstream of the compressor or in a compressor inlet section.

6. The method as in claim 1, wherein
water is injected into the combustion air in such measure that a dilution of about ten percent by volume is produced for the fuel in the burner.

7. The method as in claim 1, wherein
the water is injected into the combustion air inside the compressor.

8. The method as in claim 7, wherein
the water is injected into the combustion air in an intermediate-pressure section of the compressor, or in a low-pressure section of the compressor,
or the water is injected into the combustion air between an intermediate-pressure section of the compressor and a high-pressure section of the compressor,
or between a low-pressure section of the compressor and an intermediate-pressure section of the compressor,
or between a low-pressure section of the compressor and a high-pressure section of the compressor.

9. The method as in claim 1, wherein
the water is injected into the combustion air upstream of the compressor or in a compressor inlet section.

10. The method as in claim 1, wherein
the water is injected into the combustion air by an inlet atomizing device, which produces water vapor at or in a compressor inlet section.

11. The method as in claim 1, wherein
the water is injected into the combustion air by a compressor intercooling device, which injects water into the compressor between two pressure stages of the compressor or between two pressure sections of the compressor.

12. The method as in claim 1, wherein
a hydrocarbon-free combustible gas which contains hydrogen gas is used as fuel, or
a dry, evaporated liquid fuel, for example dehydrated oil, is used as fuel, or hydrogen gas is used as fuel.

13. The method as in claim 1, wherein
water is injected into the combustion air in such measure that a dilution of about ten percent by volume is produced for the fuel in the burner.

14. The method as in claim 1, wherein
the water is injected into the combustion air inside the compressor.

15. The method as in claim 1, wherein
the water is injected into the combustion air upstream of the compressor or in a compressor inlet section.

16. The method as in claim 1, wherein
the water is injected into the combustion air by an inlet atomizing device, which produces water vapor at or in a compressor inlet section.

* * * * *